United States Patent
Wu et al.

(10) Patent No.: US 11,720,726 B1
(45) Date of Patent: Aug. 8, 2023

(54) SYSTEMS AND METHODS OF SIMULATING DROP SHOCK RELIABILITY OF SOLDER JOINTS WITH A MULTI-SCALE MODEL

(71) Applicant: ANSYS, Inc., Canonsburg, PA (US)

(72) Inventors: Cheng-Tang Wu, Livermore, CA (US); Wei Hu, Mountain View, CA (US); Dandan Lyu, Dublin, CA (US); Siddharth Shah, Irvine, CA (US); Ashutosh Srivastava, Mountain View, CA (US)

(73) Assignee: ANSYS Inc., Canonsburg, PA (US)

( * ) Notice: Subject to any disclaimer, the term of this patent is extended or adjusted under 35 U.S.C. 154(b) by 273 days.

(21) Appl. No.: 17/084,367

(22) Filed: Oct. 29, 2020

Related U.S. Application Data (60) Provisional application No. 63/056,418, filed on Jul. 24, 2020.

(51) Int. Cl.
| | |
|---|---|
| *G06F 30/20* | (2020.01) |
| *G06F 119/02* | (2020.01) |
| *G06F 115/12* | (2020.01) |
| *G06F 111/04* | (2020.01) |
| *G06F 30/25* | (2020.01) |

(Continued)

(52) U.S. Cl.
CPC .............. *G06F 30/20* (2020.01); *G06F 30/25* (2020.01); *G06F 30/28* (2020.01); *G06F 2111/00* (2020.01); *G06F 2111/04* (2020.01); *G06F 2115/12* (2020.01); *G06F 2119/02* (2020.01); *G06F 2119/22* (2020.01)

(58) Field of Classification Search
CPC .. G06F 30/20; G06F 2111/04; G06F 2115/12; G06F 2119/02; G06F 30/25; G06F 30/27; G06F 30/28; G06F 2111/00; G06F 2119/22
See application file for complete search history.

(56) References Cited

U.S. PATENT DOCUMENTS

| | | | |
|---|---|---|---|
| 8,285,522 B1 * | 10/2012 | Tryon, III | G06F 30/23 703/2 |
| 10,068,039 B1 * | 9/2018 | Vennam | H05K 3/0005 |

(Continued)

OTHER PUBLICATIONS

Q. Yu, H. Kikuchi, S. Ikeda, M. Shiratori, M. Kakino, N. Fujiwara, "Dynamic Behavior of Electronics Package and Impact Reliability of BGA Solder Joints" pp. 953-960, 2002 IEEE (Year: 2002).*

*Primary Examiner* — Kibrom K Gebresilassie (57) ABSTRACT

A global computer aided engineering (CAE) model representing an electronic product that contains solder joints and an individual detailed solder joint model are received. The solder joint model can include a solder ball, one or more metal pads, a portion of printed circuit board, and a portion of semiconductor chip component. The global CAE model includes locations of the solder joints to be evaluated in a drop test simulation. The solder joint model is replicated at each location to create a local CAE model via a geometric relationship between the global CAE model and the local CAE model. Simulated physical behaviors of the product under a design condition are obtained in a co-simulation using the global CAE model in a first time scale and the local CAE model in a second time scale. Simulated physical behaviors are periodically synchronized based on kinematic and force constraints.

16 Claims, 11 Drawing Sheets

(51) Int. Cl.
*G06F 119/22* (2020.01)
*G06F 30/28* (2020.01)
*G06F 111/00* (2020.01)

(56) References Cited

U.S. PATENT DOCUMENTS

| | | | | |
|---|---|---|---|---|
| 2004/0227233 | A1* | 11/2004 | Hussa | H01L 24/10 |
| | | | | 257/E21.511 |
| 2006/0294436 | A1* | 12/2006 | Sakai | G06F 30/23 |
| | | | | 714/39 |
| 2009/0234605 | A1* | 9/2009 | Kashiwakura | H05K 3/0005 |
| | | | | 702/69 |
| 2017/0308633 | A1* | 10/2017 | Lee | G06F 30/23 |

* cited by examiner

SYSTEMS AND METHODS OF SIMULATING DROP SHOCK RELIABILITY OF SOLDER JOINTS WITH A MULTI-SCALE MODEL

CROSS-REFERENCE TO RELATED APPLICATIONS

This application claims benefits of U. S. Provisional Patent Application Ser. No. 63/056,418 for "SYSTEMS AND METHODS OF SIMULATING DROP SHOCK RELIABILITY OF SOLDER JOINTS WITH A MULTI-SCALE MODEL", filed Jul. 24, 2020. The contents of which are hereby incorporated by reference in its entirety for all purposes.

TECHNICAL FIELD

The subject matter described herein relates to computer-aided engineering analysis (CAE), more particularly to systems and methods of simulating drop shock reliability of solder joints in consumer electronic products with a portable multiscale CAE model.

BACKGROUND

Soldering is a process in which two or more items are joined together by melting and putting a filler metal (solder) into the joint, the filler metal having a lower melting point than the adjoining metal. Soldering has been used in electronic industry in many applications, for example, connecting electrical wiring to devices, electronic components to printed circuit boards, etc. Solder joint cracks caused by overloading are often the result of an accident or harsh treatment. For example, when dropping a small electronic device (e.g., mobile phone, flat screen monitor, etc.). The shear strength of the solder is exceeded, resulting in fracture of the joint.

Drop shock/impact reliability is an important concern for the design and use of portable electronic products. When the product is accidentally dropped on the ground, impact forces are transmitted from the product case to the printed circuit board (PCB) and other components within the case. These forces may cause severe functional damage in the form of component failure and/or interconnection breakage. In order to properly design solder joint in a consumer electronic device, a number of drop tests need to be performed to cover various scenarios (e.g., drop tests of 6 surfaces, 8 corners, 12 edges). Physical drop tests are expensive and time consuming.

With advance of the computers, CAE analysis has been used for supporting engineers in many tasks including simulation of a drop test. There are many methods in CAE including, but not limited to, finite element analysis (FEA), smoothed-particle Galerkin (SPG) method, etc.

FEA is a computer-implemented method widely used in industry to simulate (i.e., model and solve) engineering problems relating to complex products or systems such as three-dimensional linear and/or nonlinear structural design and analysis. FEA derives its name from the manner the geometry of the object under consideration is specified. The geometry is defined with nodal points connected by finite elements. There are many types of finite elements, solid finite elements for volumes or continua, shell or plane finite elements for surfaces, and beam or truss finite elements for one-dimensional objects.

SPG is a computational method used for simulating the mechanics of continuum media, such as solid mechanics. It is a meshfree Lagrangian method, and the resolution of the method can easily be adjusted with respect to variables such as density.

Prior art approaches for simulating a drop test of a consumer electronic device have been based on a simplified solder joint model and sub-modeling technique that cannot provide high fidelity results, for example, nonlinear solution, sophisticated failure modes, etc.

SUMMARY

In one aspect of the disclosure, an individual detailed solder joint model and a global computer aided engineering (CAE) model representing an electronic product are received in a computer system. Solder joint model can include a solder ball, a metal pad, a portion of printed circuit board, and a portion of semiconductor chip component. The global CAE model includes positions/locations of those solder joints to be evaluated in a drop test simulation. The solder joint model is replicated at each solder joint location to create the local CAE model via a geometric relationship between the global CAE model and the local CAE model. Simulated physical/structural behaviors of the electronic product under a design condition are obtained in a co-simulation using the global CAE model in a first time scale and the local CAE model in a second time scale. Simulated physical/structural behaviors are periodically synchronized based on kinematic and force constraints.

In another aspect, performance of a solder joint can be evaluated in a simulation. Various failure modes of a solder joint can be determined using corresponding solder joint models. Solder joint failure modes may include, but not limited to, solder ball fracture/crack, metal pad peeling, PCB damage near a solder joint, etc.

In yet another aspect, a computer aided engineering (CAE) model representing an electronic product is received in a computer system. The electronic product contains a solder joint. The CAE model indicates a location of the solder joint in the electronic product. A solder joint model is generated to represent the solder joint. The solder joint model is coupled with the CAE model via the location. Physical behaviors of the electronic product are simulated using the CAE model in a first time scale and the solder joint model in a second time scale. The physical behaviors are periodically synchronized based on a set of constraints (i.e., kinematic and force constraints).

Non-transitory computer-readable medium (i.e., physically embodied computer program products) is described that stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

System and methods are provided for simulating drop shock reliability of solder joints in consumer electronic products with a portable multiscale computer aided engineering (CAE) model. A solder joint model and a global CAE model representing an electronic product are received in a computer system. Solder joint model can include a solder ball, one or more metal pads, a portion of printed circuit board, and a portion of semiconductor chip component. The global CAE model includes positions/locations of those solder joints to be evaluated in a drop test simulation. The solder joint model is replicated at each solder joint location to create a local CAE model via a geometric relationship between the global CAE model and the local CAE model. Simulated physical/structural behaviors of the electronic product under a design condition (e.g., a drop test) are obtained in a co-simulation using the global CAE model in a first time scale and the local CAE model in a second time scale. Simulated physical behaviors are periodically synchronized based on kinematic and force constraints.

Performance of a solder joint can be evaluated in a simulation. Various failure modes of a solder joint can be determined using corresponding solder joint models. Solder joint failure modes may include, but not limited to, solder ball fracture/crack, metal pad peeling, PCB damage near a solder joint, etc.

Figure 1A:
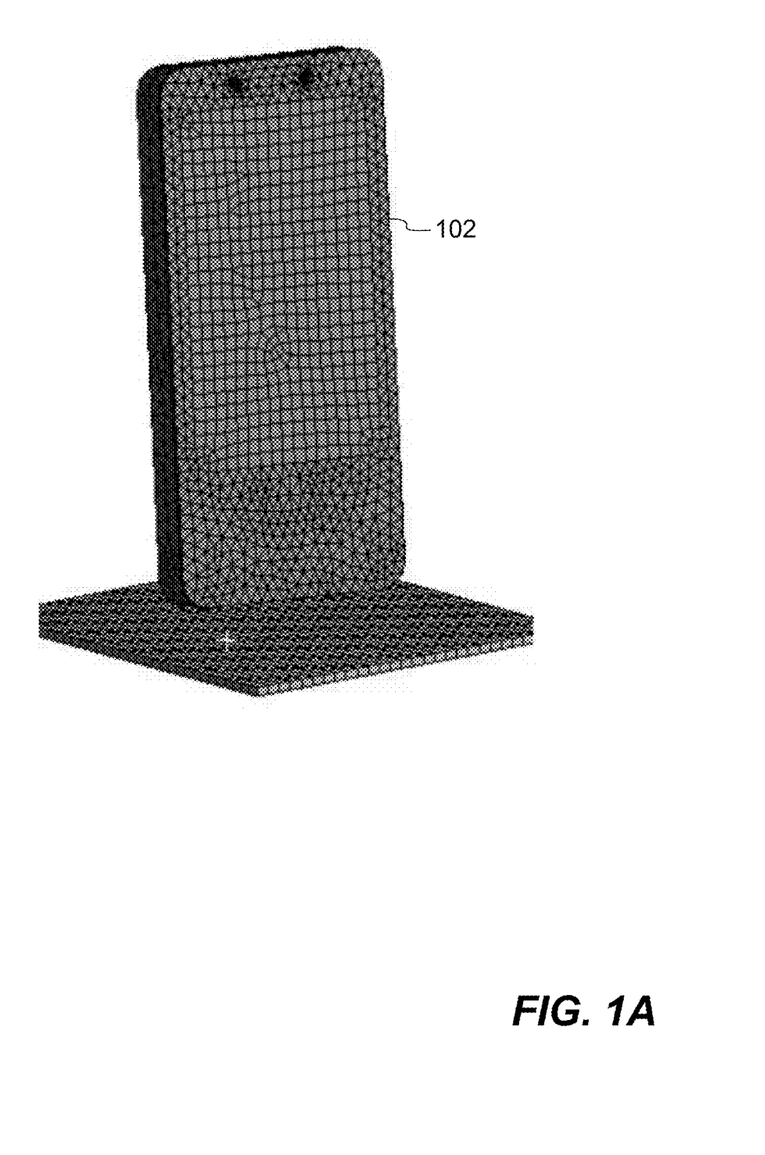
FIGS. 1A-1B are diagrams illustrating a first CAE model representing an example electronic product with a printed circuit board embedded therein.
Figure 1B:
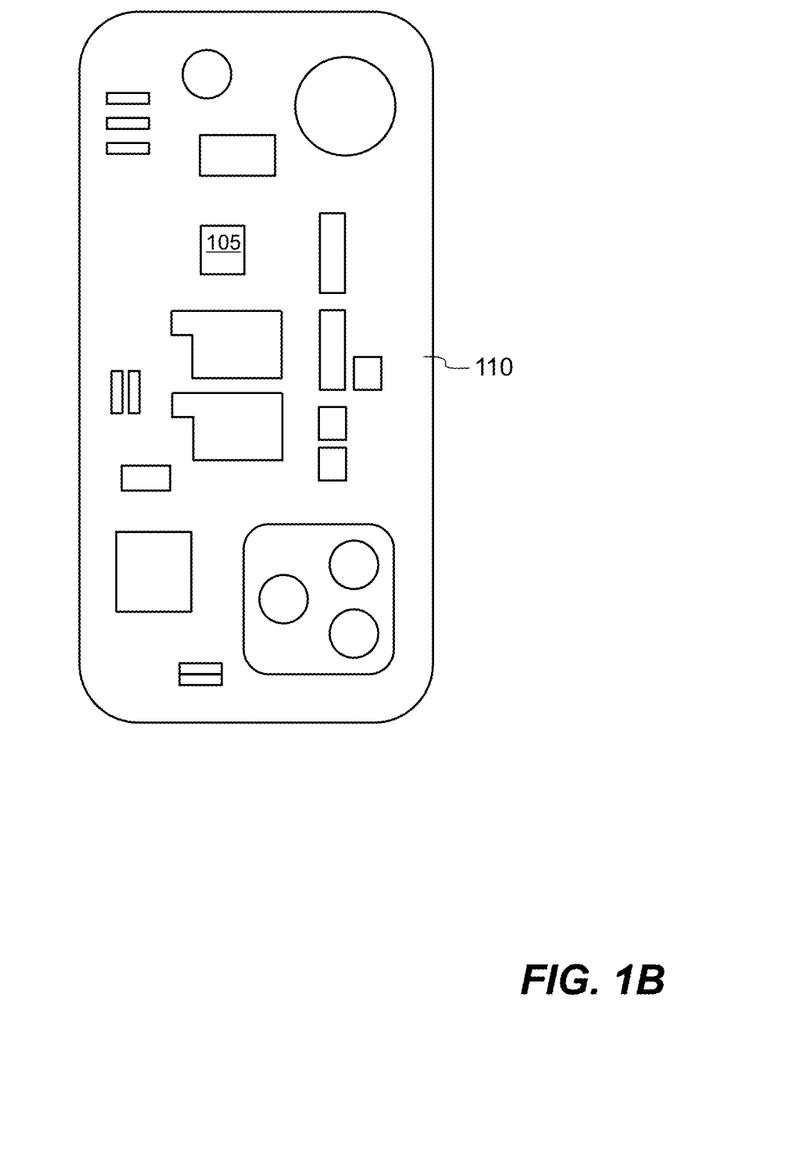

FIG. 1A is a diagram showing an example CAE model 102 representing a cellular phone—an electronic product. At least one printed circuit board (PCB) is embedded inside an electronic product. PCB mechanically supports and electrically connects electrical or electronic components using conductive paths, pads and other features etched from one or more sheets of conductive material (e.g., copper) laminated onto and/or between layers of a non-conductive substrate. An example CAE model of a PCB 110 is shown in FIG. 1B. There are many components mounted on the PCB 110, for example a semiconductor chip 105. The connection between a semiconductor chip 105 and the PCB 110 is through solder joints. The CAE model of the PCB 110 include positions/locations of those solder joints to be evaluated in a simulation.

Generally, the size of a PCB in a cellular phone is about 75 mm×150 mm, while the size of a solder joint is about 0.01-0.1 mm. In order to capture the structural behaviors in a simulation, the CAE model needs to accommodate the much smaller size of solder joints, which may not be practical in terms of computational costs and time. Therefore, simulations require two CAE models: a global CAE model representing electronic product/PCB and a local CAE model representing solder joints. The global CAE model contains relatively larger sized elements while the local CAE model contains much smaller sized elements. As a result, two CAE models are simulated in two different time scales in a simulation or co-simulation. The global CAE model can be simulated in a relative larger time scale (i.e., larger time steps). The local CAE model needs to be simulated in a much smaller time scale.

Figure 2A:
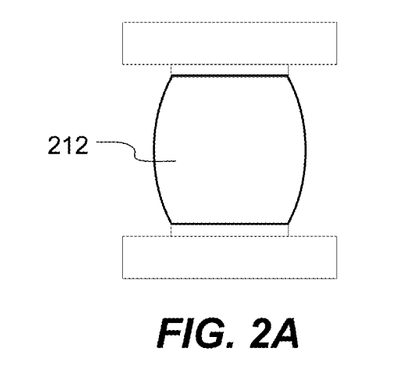
FIGS. 2A-2B are diagrams showing example detailed solder joint models.
Figure 2B:
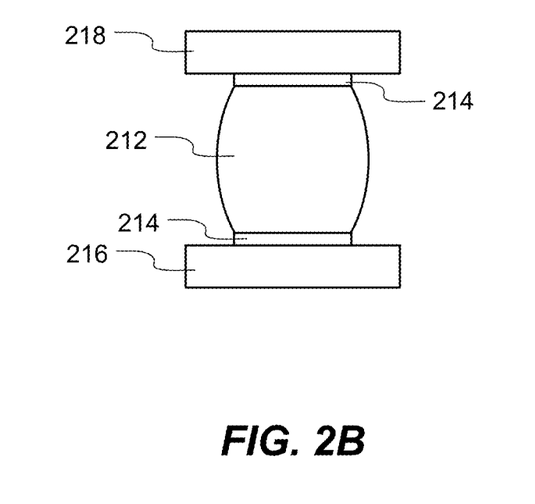

A first detailed solder joint model includes a solder ball 212 shown in FIG. 2A. FIG. 2B shows a second detailed solder joint model, which can include a solder ball 212, one or more metal pads 214, a portion of a PCB 216, and/or a portion of chip component 218. A solder joint model can include various components to accommodate the requirements for determining which failure mode or failure modes.

Solder ball 212 can be modeled with solid finite elements. Solid finite element is a three-dimensional finite element (e.g., hexahedral elements, tetrahedral elements, etc.). Each metal pad 214 can be modeled with solid finite elements, cohesive interface elements or interface elements. A cohesive interface element is an element designed for simulating separation of two surfaces. For example, the cohesive interface element can be 6-noded or 8-noded solid element with initial zero-thickness. Two faces of the element are connected by a spring-like material law at nodes which allows a total separation (e.g., peeling) after reaching failure criteria. Each portion of PCB 216 or each portion of the chip component 218 can be modeled with a composite element. The composite element is a solid element with embedded inclusions that are modeled with beam or solid elements. The inclusions may be fibers, wires, etc. For different CAE other than finite element analysis, solder joints may also be modeled, for example, using SPG elements. SPG element is a particle with a domain of influence to interact with another SPG element.

Figure 3:
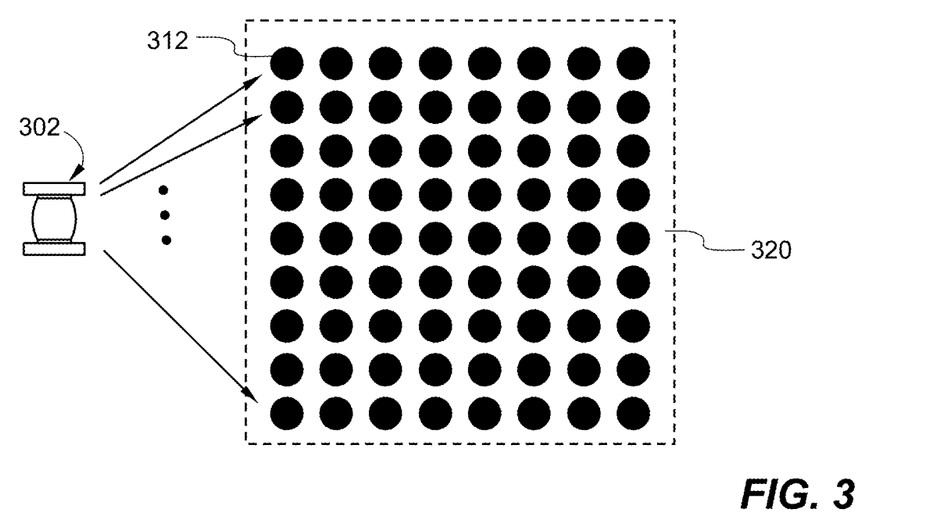
FIG. 3 is a schematic diagram illustrating replication of a detailed solder joint model to create a second CAE model containing a number of solder joints.

FIG. 3 is a diagram showing a detailed solder joint model 302 is replicated at each solder joint position 312 to create a local CAE model 320. In one embodiment, a local CAE model contains a number of solder joints for connecting a semiconductor chip to a PCB. Solder joint positions 312 can be defined in the global CAE model.

Figure 4:
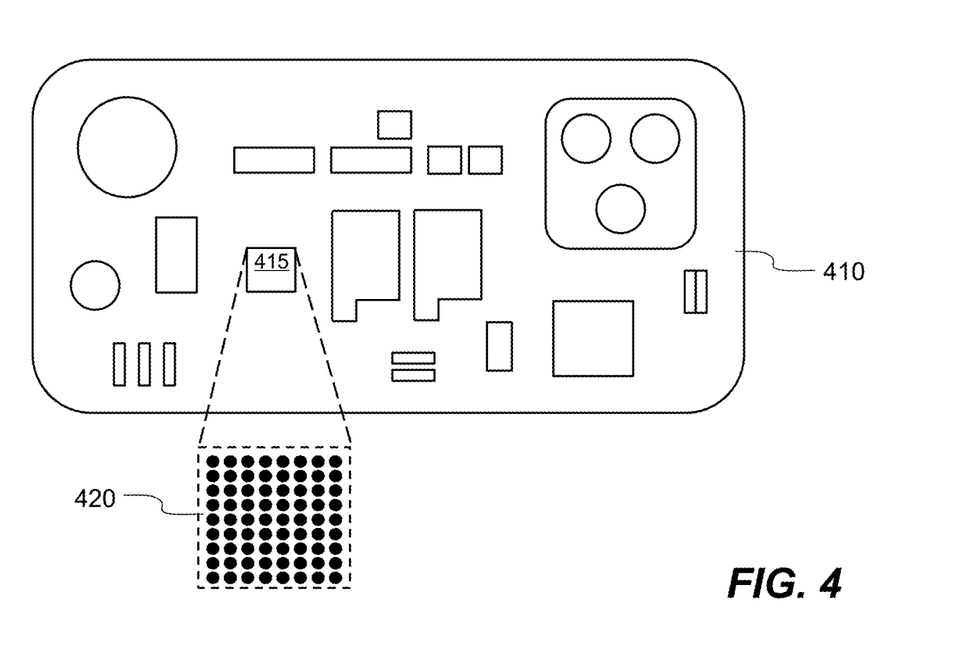
FIG. 4 is a schematic diagram illustrating a geometric relationship between two different time-scale CAE models.

FIG. 4 shows that a global CAE model 410 of a PCB contains a semiconductor chip of interest 415, which is connected to the PCB via solder joints to be evaluated in a simulation. The solder joint positions are specified/defined in the global CAE model 410. To create a local model 420 of solder joints, each solder joint model is replicated at the solder joint position in the local model 420 via a geometric relationship with the global CAE model 410.

A geometric relationship between the global CAE model 410 and the local CAE model 420 can be used for creating the local CAE model 420. The geometric relationship can be established with many known methods, for example, corresponding global/local coordinate systems.

Figure 5:
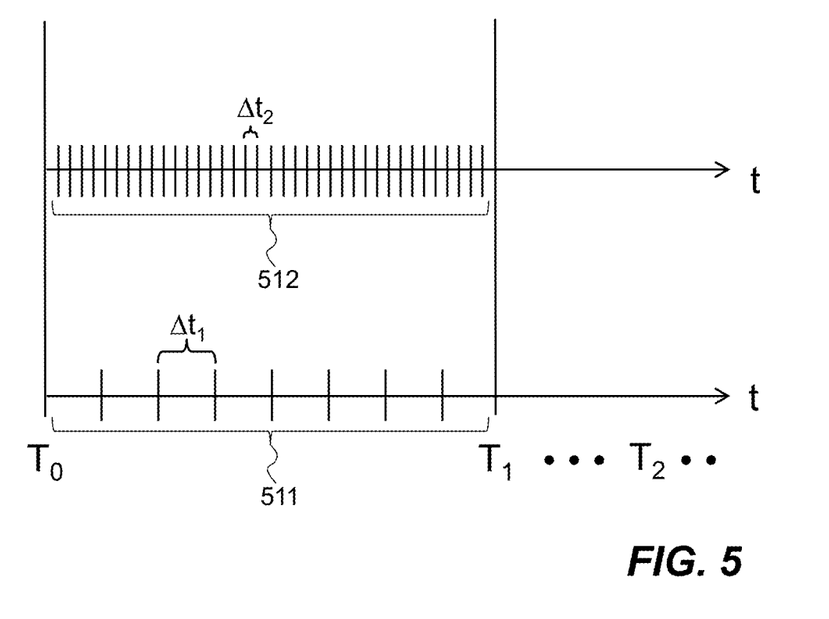
FIG. 5 is a diagram illustrating two different time scales used in a co-simulation with two different time-scale CAE models.

FIG. 5 shows two different time scales using in a simulation or co-simulation. A first time scale 511 is for a global CAE model, while the second time scale 512 is for a local CAE model. Due to the limitation of Courant time step, the first time scale has time step $\Delta t_1$, while the second time scale has time step $\Delta t_2$. For illustration simplicity and clarity, two time scales are shown with less difference than they are. In reality, the difference can be 10 times or more.

Figure 6:
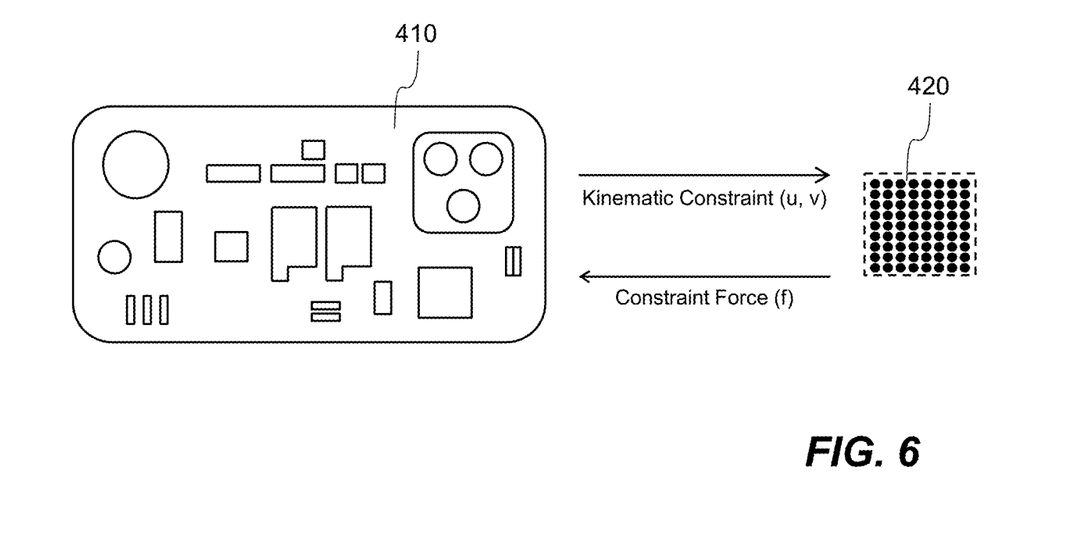
FIG. 6 is a diagram illustrating example synchronization between two different time-scale CAE models in a co-simulation.

In a co-simulation, the calculated results of the global CAE model and those of the local CAE model need to be synchronized at predetermined times (e.g., $T_0, T_1, T_2, \ldots$). The synchronization is based on a set of constraints as shown in FIG. 6. At each synchronization time, the global CAE model 410 sends kinematic constraint (e.g., displacements (u,v)) to the local CAE model 420. The local CAE model 420 sends force constraint (e.g., forces) to the global CAE model 410.

Figure 7:
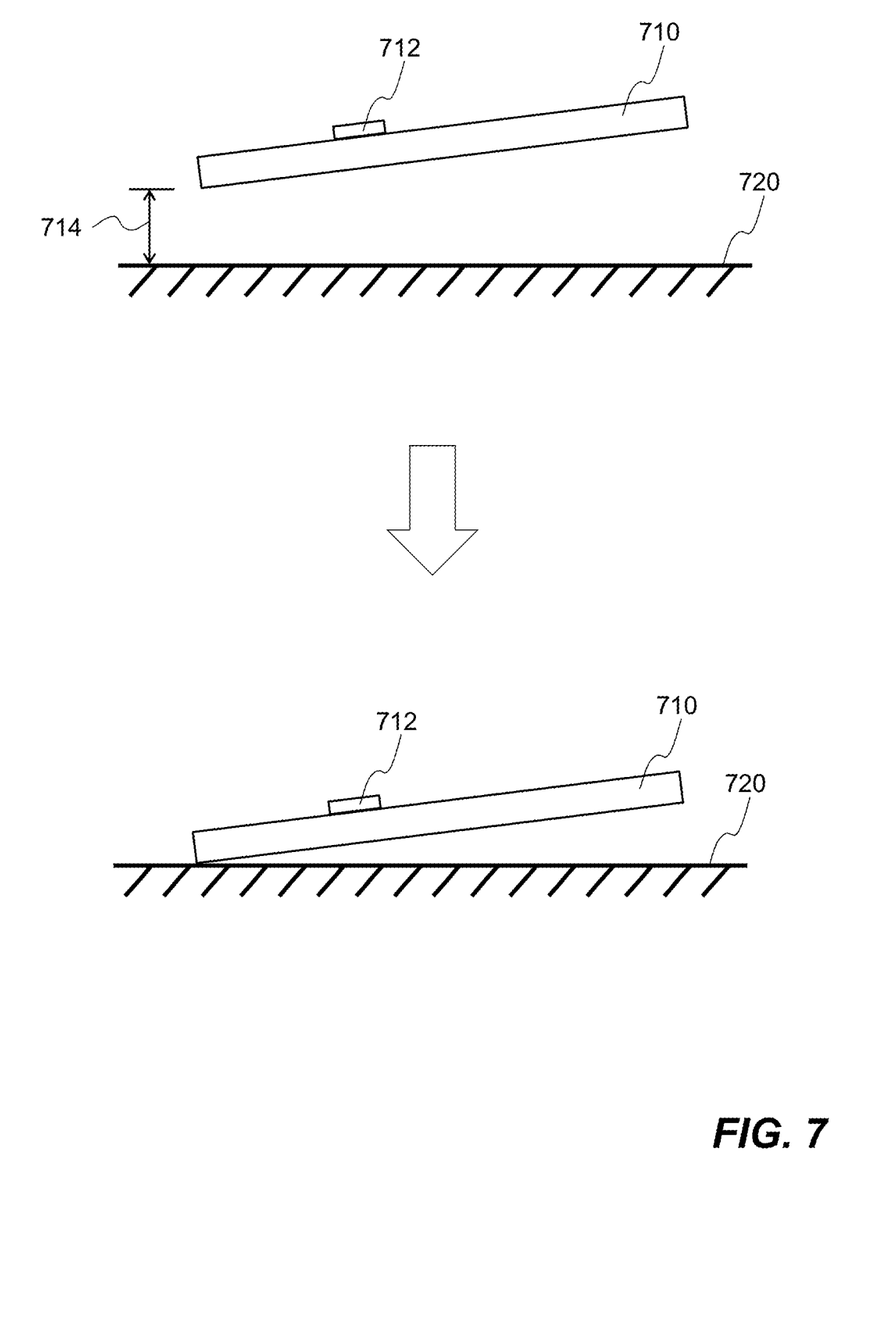
FIG. 7 is a diagram showing an example design condition of an electronic product.

FIG. 7 shows an example design condition to drop an electronic device from a predefined vertical height 714 (e.g., one meter or more) to a hard surface 720 (e.g., ground). A PCB 710 of an electronic device containing a chip 712 drops one meter to a hard surface 720 (e.g., ground). The chip 712 is soldered to the PCB 710. Depending upon which of the failure modes are of interest, solder joint model can be created accordingly. There are other design conditions, for example, different orientations of the PCB 710, different chips, different heights 714, etc.

Figure 8A:
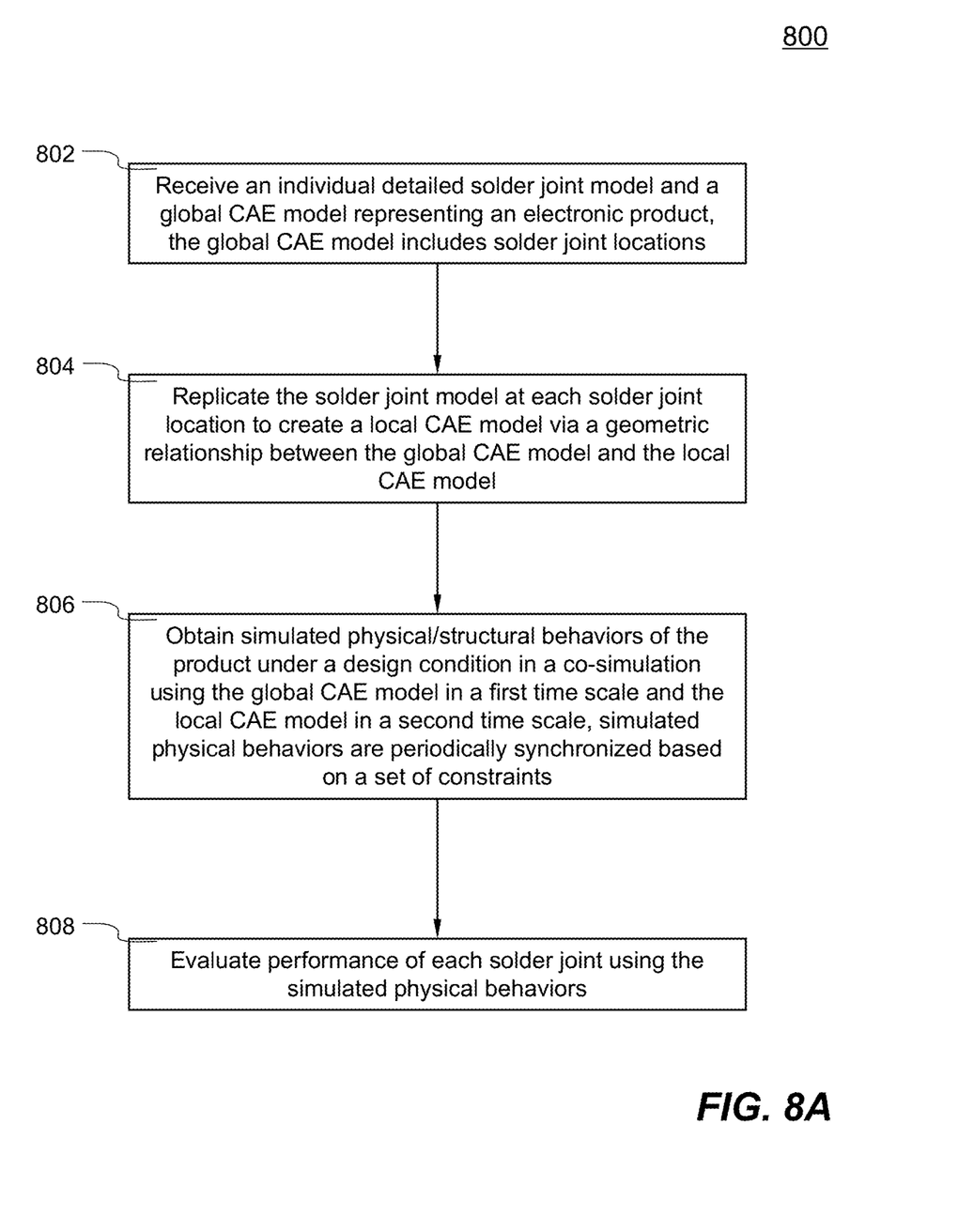
FIG. 8A is a flowchart illustrating an example process of evaluating performance of a solder joint in an electronic product under a design condition in a co-simulation with two different time-scale models.

FIG. 8A is a flowchart illustrating an example process 800 of simulating drop shock reliability of an electronic product. Process 800 starts at action 802, an individual detailed solder joint model and a first CAE model (i.e., a global CAE model) are received in a computer system (e.g., computer systems shown in FIGS. 9A-9B). The first CAE model represents an electronic product, which contains a number of positions/locations of solder joints to be evaluated in a simulation. Solder joints can be arbitrarily located in a PCB. The solder joint model can include a solder ball, one or more metal pads, a portion of the PCB, and a portion of semiconductor chip component. Solder joint model can be received as an input data created by a user. The solder joint model can also be retrieved from a database containing previously created models (e.g., standardized chip package models).

Then, at action 804, the solder joint model is replicated at each solder joint position to create a second CAE model (i.e., a local CAE model) via a geometric relationship between the first CAE model and the second CAE model. Next, at action 806, simulated structural/physical behaviors of the electronic product under a design condition are obtained in a simulation. The design condition can be a drop test shown in FIG. 7. The simulation uses the first CAE model in a first time scale and a second CAE model in a second time scale. Since there are two CAE models in the simulation, it is therefore referred to as a co-simulation. The first CAE model and the second CAE model can also be referred to as global CAE model and local CAE model, respectively. The first CAE model represents the electronic product having a first element size, while the second CAE model represents solder joints each with a second element size. The difference between the first element size and the second element size leads to different time scales. Calculated results of the two CAE models are periodically synchronized based on kinematic constraint and force constraint.

Finally, at action 808, performance of each solder joint is evaluated using the simulated structural/physical behaviors. The performance can show one of the failure modes of a solder joint. Failure can happen in the solder ball, one or more of metal pads, and/or the portion of PCB, and/or the portion of the semiconductor chip component. In order to catch certain failure modes in the simulation, the solder joint model needs to include respective parts accordingly.

Figure 8B:
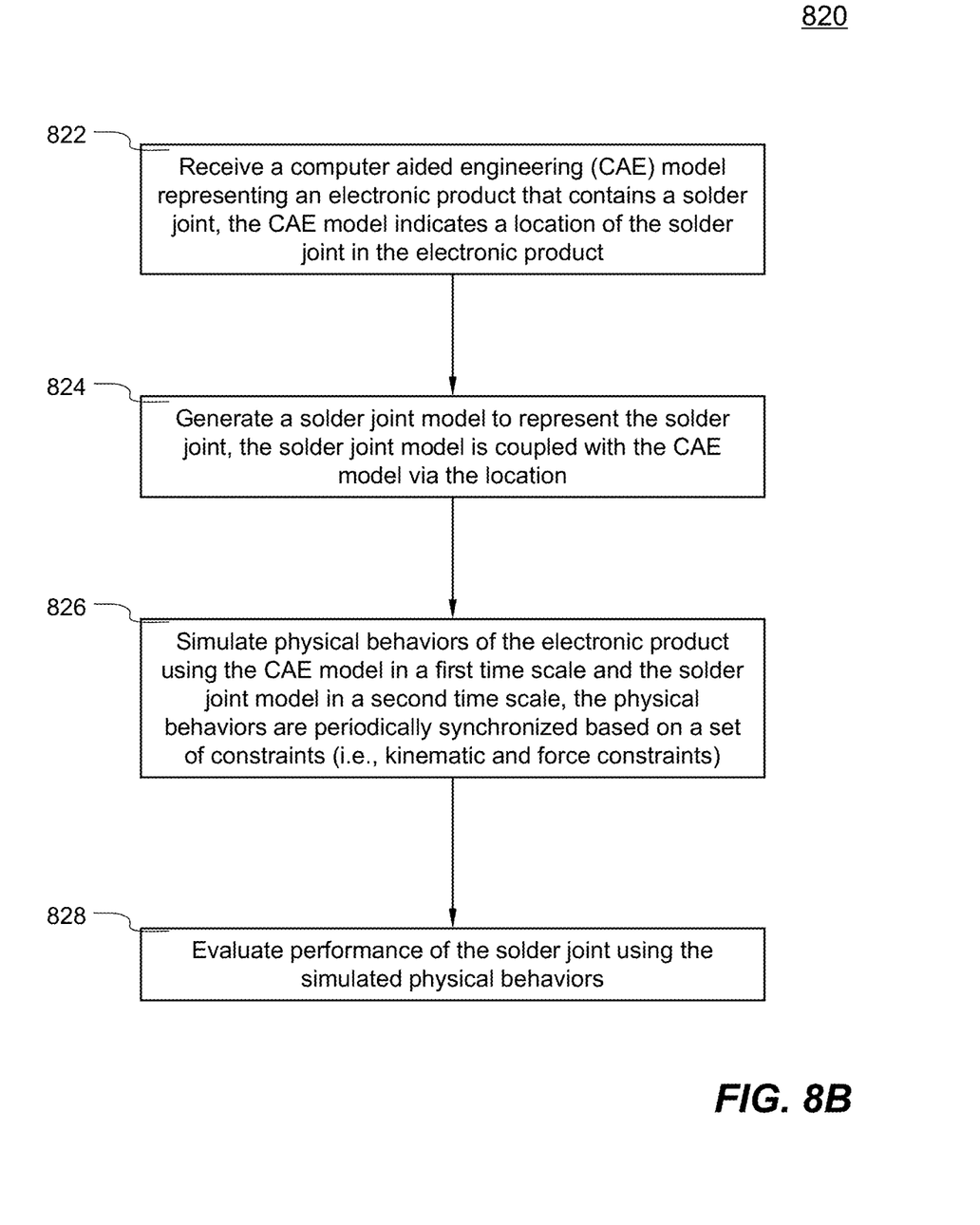
FIG. 8B is a flowchart illustrating an alternative example process of evaluating performance of a solder joint in an electronic product under a design condition in a co-simulation with two different time-scale models.

An alternative example process 820 of simulating drop shock reliability of an electronic product is illustrated as a flowchart in FIG. 8B. Process 820 starts at action 822 by receiving a computer aided engineering (CAE) model representing an electronic product that contains a solder joint. The CAE model indicates a location of the solder joint in the electronic product. Then, at action 824, a solder joint model is generated to represent the solder joint. The solder joint model is coupled with the CAE model via the location. Next, at action 826, structural/physical behaviors of the electronic product are simulated using the CAE model in a first time scale and the solder joint model in a second time scale. The structural/physical behaviors are periodically synchronized based on a set of constraints (i.e., kinematic and force constraints). Finally, at action 828, performance of the solder joint is evaluated using the simulated structural/physical behaviors.

The subject matter described herein may be implemented using any suitable processing system with any suitable combination of hardware, software and/or firmware, such as described below with reference to the non-limiting examples shown in FIGS. 9A-9C.

Figure 9A:
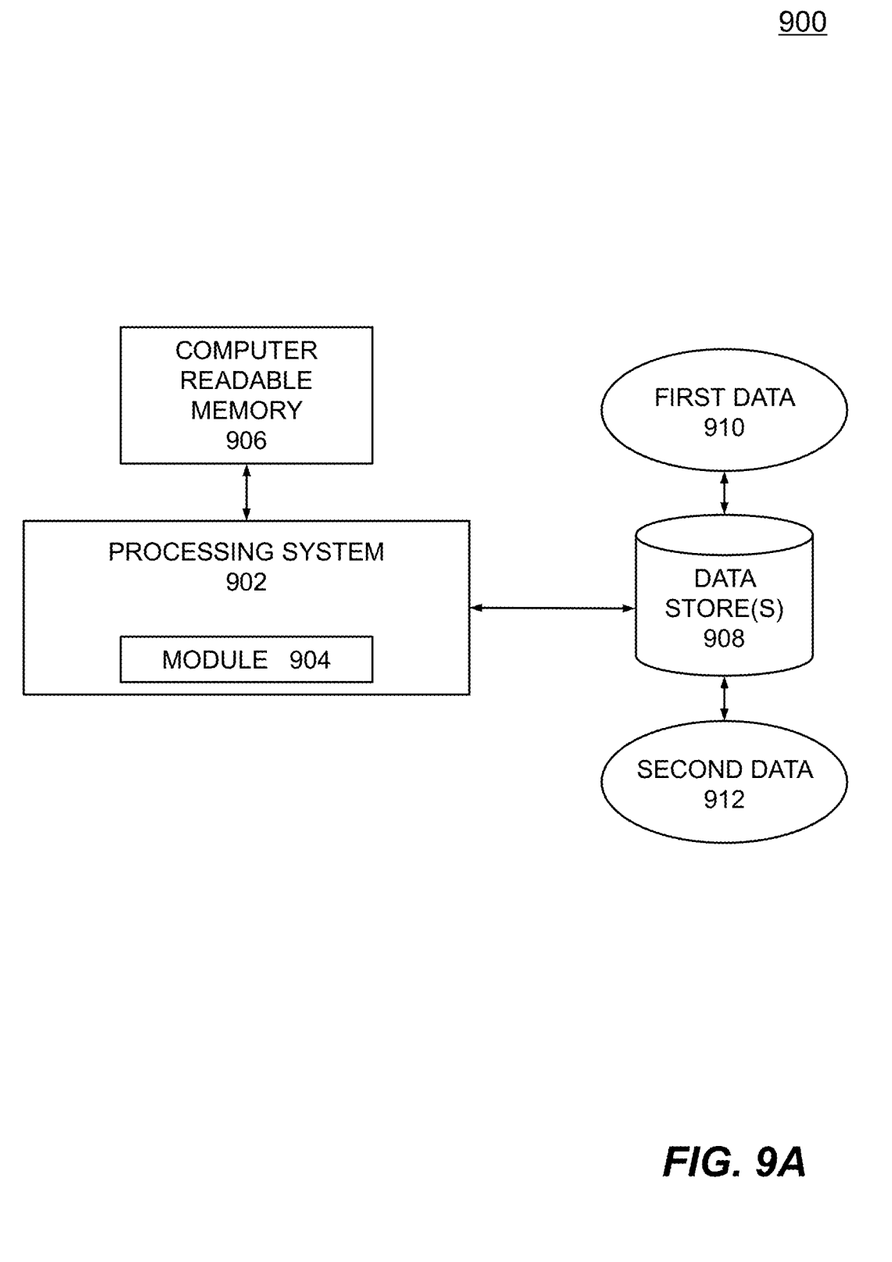
FIG. 9A is a block diagram showing an example system including a standalone computing architecture.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. The one or more data stores 908 may contain first data 910 as well as second data 912.

Figure 9B:
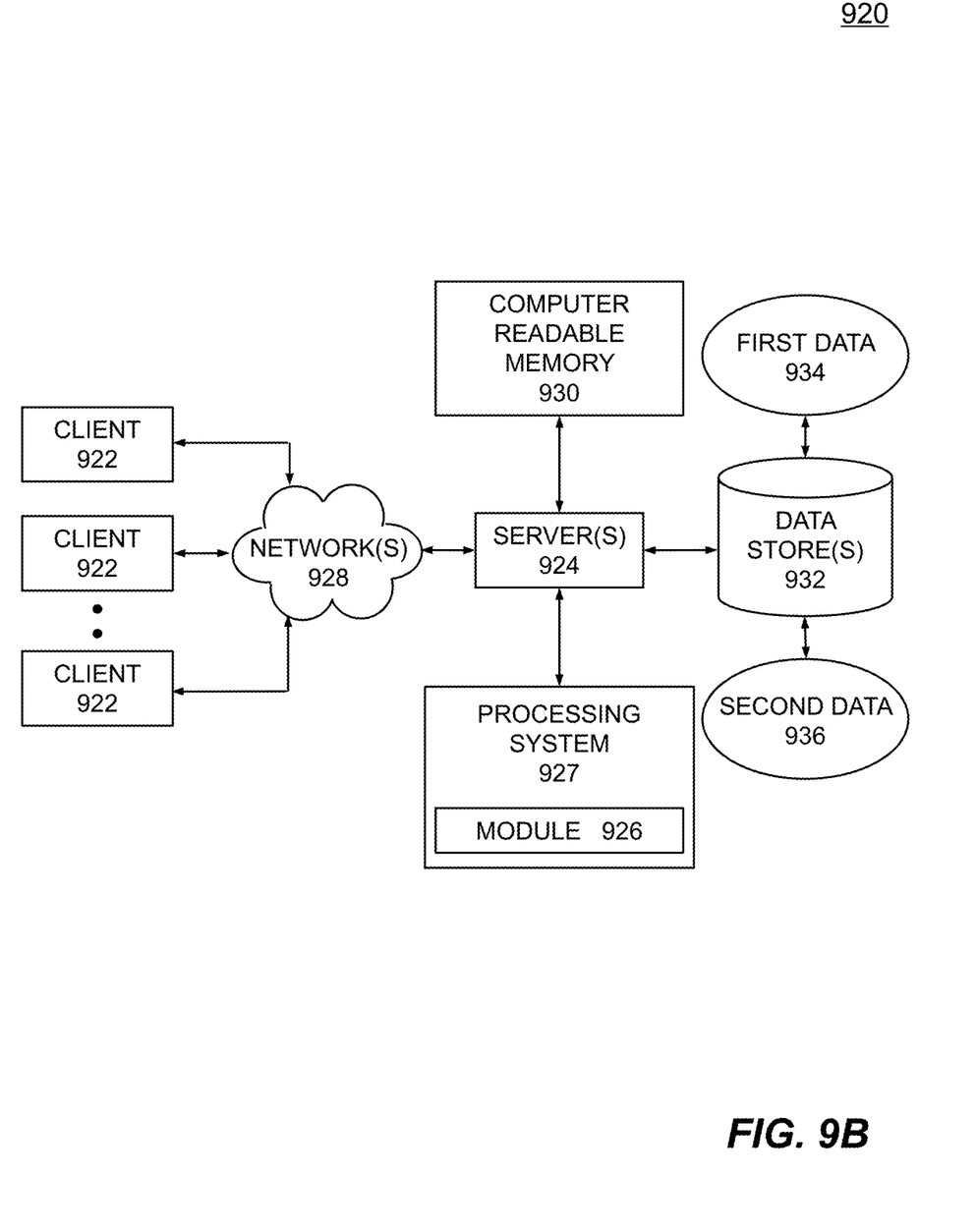
FIG. 9B is a block diagram showing an example system including a client-server computing architecture.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

Figure 9C:
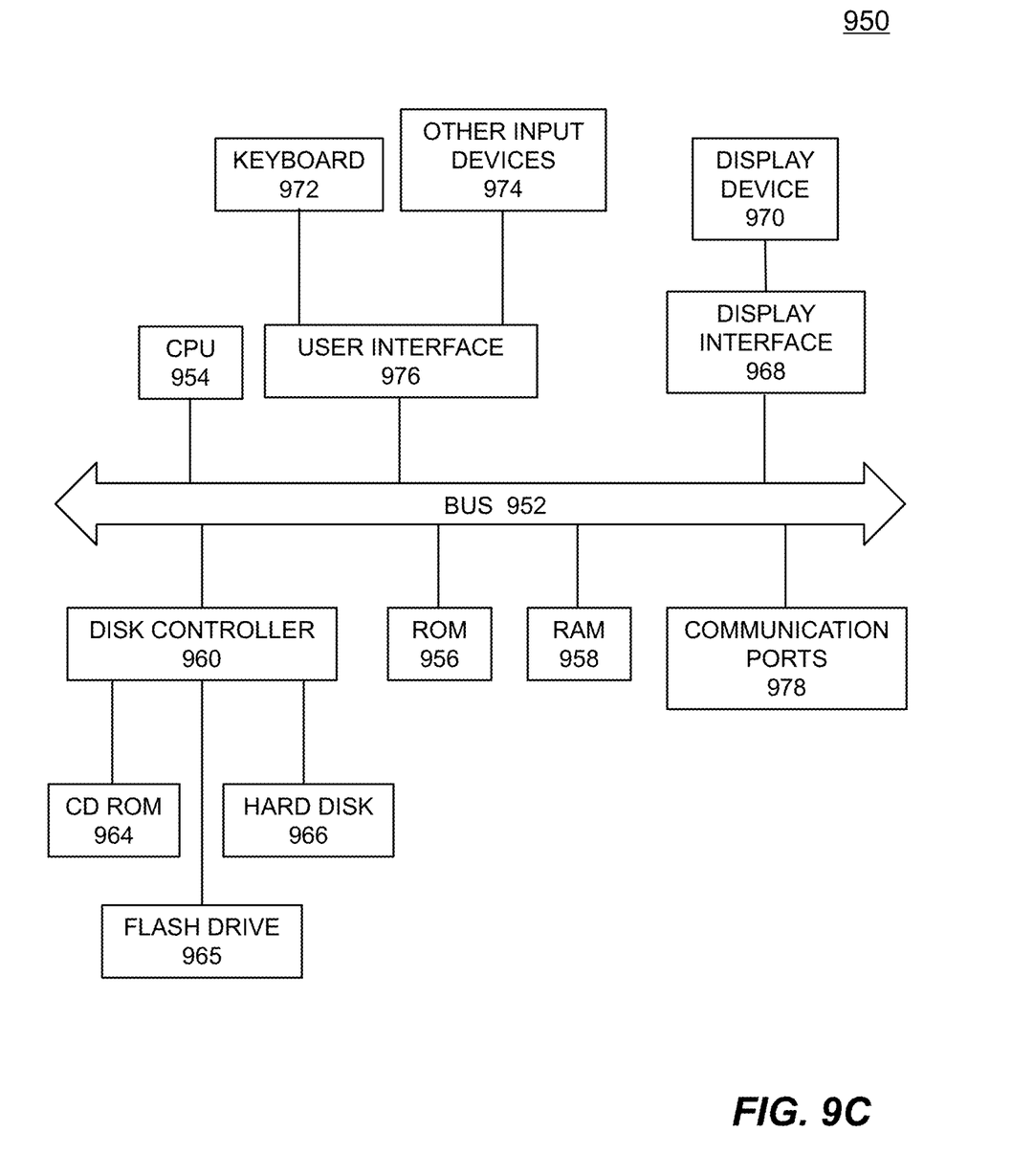
FIG. 9C is a function block diagram showing salient components of an example computing device for implementing the subject matters described herein.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphic, text, or alphanumeric format.

In addition to the standard computer-type components, the hardware may also include data input devices, such as a keyboard 972, or other input device 974, such as a microphone, remote control, pointer, mouse, touch screen, and/or joystick.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas example solder joints have been shown in two dimensional view for illustration simplicity and clarity, solder joints are three dimensional objects. Additionally, whereas solder joint positions have been shown and described as a two dimension, solder joints can be positioned arbitrarily in any arrangement and in a three dimensional space. Furthermore, whereas CAE has been shown and described as FEA and SPG, other types of CAE may be used for achieving the same. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:
 receiving a computer aided engineering (CAE) model for representing an electronic product that contains a solder joint, the CAE model indicating a location of the solder joint in the electronic product;
 generating a solder joint model to represent the solder joint, the solder joint model coupled with the CAE model via the location, the electronic product represented based on the CAE model coupled with the solder joint model; and
 performing simulation of physical behaviors of the electronic product using the CAE model in a first time scale and the solder joint model in a second time scale, the CAE model simulated with the first time step of the first time scale, the solder joint model simulated with a second time step of the second time scale, the first time step larger than the second time step, the CAE model and the solder joint model co-simulated with a set of constraints synchronized periodically between the CAE model and the solder model.

2. The method of claim 1, wherein the solder joint comprises a solder ball.

3. The method of claim 2, further comprises evaluating performance of the solder joint using the simulated physical behaviors, wherein the performance comprises a failure in the solder ball.

4. The method of claim 2, wherein the solder ball is modeled with solid finite elements.

5. The method of claim 2, wherein the solder ball is modeled with smooth particle Galerkin elements.

6. The method of claim 1, wherein the solder joint comprises one or more metal pads.

7. The method of claim 6, further comprising evaluating performance of the solder joint using the simulated physical behaviors, wherein the performance comprises a failure in the one or more metal pads.

8. The method of claim 6, wherein each metal pad is modeled with cohesive interface elements.

9. The method of claim 6, wherein each metal pad is modeled with solid finite elements.

10. The method of claim 1, wherein the solder joint model comprises a portion of a printed circuit board (PCB) in the product.

11. The method of claim 10, further comprising evaluating performance of the solder joint using the simulated physical behaviors, wherein the performance comprises a failure in the portion of the PCB.

12. The method of claim 10, wherein the portion of the PCB is modeled with composite material elements.

13. The method of claim 1, wherein the set of constraints comprises a kinematic constraint from the CAE model to the solder joint model.

14. The method of claim 1, wherein the set of constraints comprises a force constraint from the solder joint model to the CAE model.

15. A system comprising:
a bus;
a memory storing instructions;
one or more processors coupled to the bus and the memory, the one or more processors executing the instructions from the memory to perform a method comprises:
receiving a computer aided engineering (CAE) model for representing an electronic product that contains a solder joint, the CAE model indicating a location of the solder joint in the electronic product;
generating a solder joint model to represent the solder joint, the solder joint model coupled with the CAE model via the location, the electronic product represented based on the CAE model coupled with the solder joint model; and
performing simulation of physical behaviors of the electronic product using the CAE model in a first time scale and the solder joint model in a second time scale, the CAE model simulated with the first time step of the first time scale, the solder joint model simulated with a second time step of the second time scale, the first time step larger than the second time step, the CAE model and the solder joint model co-simulated with a set of constraints synchronized periodically between the CAE model and the solder model.

16. A non-transitory computer-readable medium storing instructions for commanding one or more processors to perform a method comprises:
receiving a computer aided engineering (CAE) model for a representing an electronic product that contains a solder joint, the CAE model indicating a location of the solder joint in the electronic product;
generating a solder joint model to represent the solder joint, the solder joint model coupled with the CAE model via the location, the electronic product represented based on the CAE model coupled with the solder joint model; and
performing simulation of physical behaviors of the electronic product using the CAE model in a first time scale and the solder joint model in a second time scale, the CAE model simulated with the first time step of the first time scale, the solder joint model simulated with a second time step of the second time scale, the first time step larger than the second time step, the CAE model and the solder joint model co-simulated with a set of constraints synchronized periodically between the CAE model and the solder model.

* * * * *